United States Patent [19]

Karasudani

[11] 4,184,571
[45] Jan. 22, 1980

[54] DISC BRAKE

[75] Inventor: Yasuo Karasudani, Yokohama, Japan

[73] Assignee: Tokico Ltd., Kawasaki, Japan

[21] Appl. No.: 860,320

[22] Filed: Dec. 14, 1977

[30] Foreign Application Priority Data

Dec. 20, 1976 [JP] Japan ................................ 51-170666

[51] Int. Cl.² ............................................. F16D 55/30
[52] U.S. Cl. ...................................... 188/72.7; 29/428;
74/55; 188/106 F
[58] Field of Search ...................... 188/72.1, 72.6, 72.7,
188/72.8, 72.9, 73.4, 73.3, 106 F; 74/55; 192/93
R; 29/428

[56] References Cited

U.S. PATENT DOCUMENTS

| 3,402,791 | 9/1968 | Hoenick | 188/106 F |
|---|---|---|---|
| 3,507,367 | 4/1970 | Brown et al. | 188/106 F |
| 4,074,795 | 2/1978 | Kondo et al. | 188/73.3 |

FOREIGN PATENT DOCUMENTS

| 2538017 | 3/1976 | Fed. Rep. of Germany | 158/73.3 |
|---|---|---|---|
| 831436 | 9/1938 | France | 74/55 |
| 1368280 | 6/1964 | France | 188/72.7 |

Primary Examiner—Edward R. Kazenske
Attorney, Agent, or Firm—Wenderoth, Lind & Ponack

[57] ABSTRACT

A disc brake including a brake lever, a cylindrical cam member rotatably supported in a mounting hole and connected to the brake lever, a push rod reciprocably disposed in a bore which opens to and extends transverse to the mounting hole, and a connecting member extending between a cam groove formed in the cam member and a recess formed in the push rod to convert the rotational movement of the cam member into linear movement of the push rod. A connecting member receiving groove is formed contiguous to the cam groove in the cam member to allow the connecting member to be received wholly within the outer periphery of the cam member during assembly.

1 Claim, 7 Drawing Figures

DISC BRAKE

BACKGROUND OF THE INVENTION

This invention relates to disc brakes and, particularly, to disc brakes of the type having a mechanical actuator including a brake lever, a cam mechanism and a push rod.

In one prior art arrangement of the aforementioned type disc brakes, the cam mechanism includes a generally cylindrical cam member having a recess defining the cam surface in the outer circumference thereof, and a connecting member in the form of a short rod with one end being received in the recess of the cam member and the other end being received in a recess formed in the adjacent surface of the push rod. The cam member is rotatably received in a mounting hole and the push rod is reciprocably received in a bore. The bore opens to the mounting hole and extends perpendicular to the axis of the mounting hole and in the direction of the movement of friction pads during application of the brake. Thus, one end of the connecting member engaging with the cam surface is located permanently in the cam member mounting hole, and the other end of the connecting member is located permanently in the push rod receiving bore and, therefore, there are experienced difficulties in assembly such that the cam member must firstly be inserted into the mounting hole, then the connecting member is inserted through the push rod receiving bore and only can thereafter, the push rod be inserted. The result of the operation cannot be inspected visually and proper engagement is sometimes not obtained. Further, scores or scratches have sometimes been observed in the sliding surfaces.

BRIEF SUMMARY OF THE INVENTION

An object of the present invention is to overcome the aforementioned difficulties by providing a connecting member receiving groove in the cam member at a location contiguous with cam defining recess with a dimension adapted to receive the connecting member wholly within the diameter of the cam member. The connecting member and the cam member can be assembled through the cam member mounting hole, so that the assembling operation can be greatly simplified, and can be performed reliably and safely.

Preferably, the connecting member is a plate-like member having a substantial width in the direction of the axis of the cam member mounting hole or in the direction of a radius of the push rod receiving bore. This arrangement makes it possible to transmit a large brake applying force as compared with that which can be transmitted by a rod-shaped connecting member in conventional disc brakes. Further, this makes it possible to prevent rotation of the push rod thus eliminating the need for any particular means arranged between the push rod and the push rod receiving bore to prevent rotation of the push rod in the bore such as has been provided in prior art devices when the push rod constitutes one element of a brake shoe clearance adjusting mechanism.

BRIEF DESCRIPTION OF THE DRAWINGS

Other objects and advantages of the present invention will become apparent from the following description with reference to the accompanying drawings, in which.

DESCRIPTION OF THE EMBODIMENTS

Figure 1:
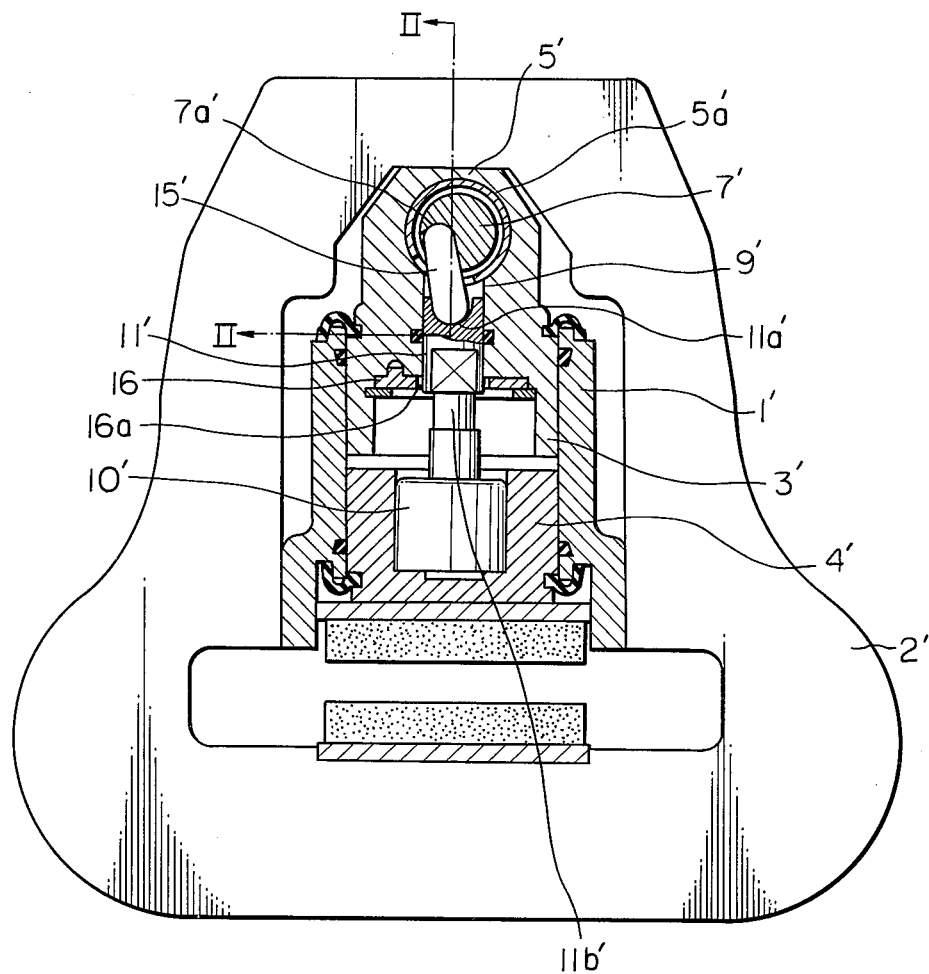
FIG. 1 is a cross-sectional plan view of a prior art disc brake.
Figure 2:
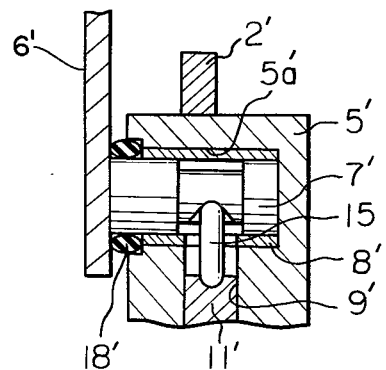
FIG. 2 is a cross-section taken along line II—II in FIG. 1.

FIGS. 1 and 2 shown one example of vehicle disc brakes having a mechanical actuator including a brake lever, cam mechanism and a push rod. In FIGS. 1 and 2, a brake lever 6' connected to a manual brake lever or the like (not shown) through a cable or the like (not shown) is secured to a cam member 7' which is mounted rotatably in a mounting hole 5a' formed in a boss portion 5' of an outer piston 3'. A cam groove 7'a is formed as a recess for receiving one end of a connecting member 15'. The other end of the connecting member 15' is received in a groove or recess 11'a of a push rod 11' to convert the rotational movement of the cam member 7' into reciprocating movement of the push rod 11' in push rod receiving bore 9'. The connecting member 15' is a rod-shaped member and should properly be located between the recesses 7a' and 11a', and thus, troublesome and time-consuming work has been required for assembling the connecting member 11', since usually the connecting member 15' has been inserted through the bore 9' prior to the push rod 11' being inserted into the bore 9'.

The disc brake shown in FIGS. 1 and 2 further includes a stationaray member 1' secured to a non-rotatable part of a vehicle and which supports a plate like yoke 2' straddling a portion of the periphery of a disc (not shown) on a wheel. The stationary member 1' has a cylinder therein slidably receiving the aforementioned outer piston 3' and an inner piston 4', which are separated from each other when pressurized fluid is introduced into the cylinder. The piston 4' acts directly on one friction pad and the piston 3' acts on the other friction pad through the yoke 2'. The push rod 11' received sealingly and slidably in the bore 9' formed in the piston 3' acts on the piston 4' through a brake shoe clearance adjusting mechanism 10' and the rotation of the push rod 11' in the bore 9' is prevented by a plate 16' secured to the piston 3' and having a rectangular opening 16'a for engaging with cutout portions 11'b in the rod 11'.

Figure 3:
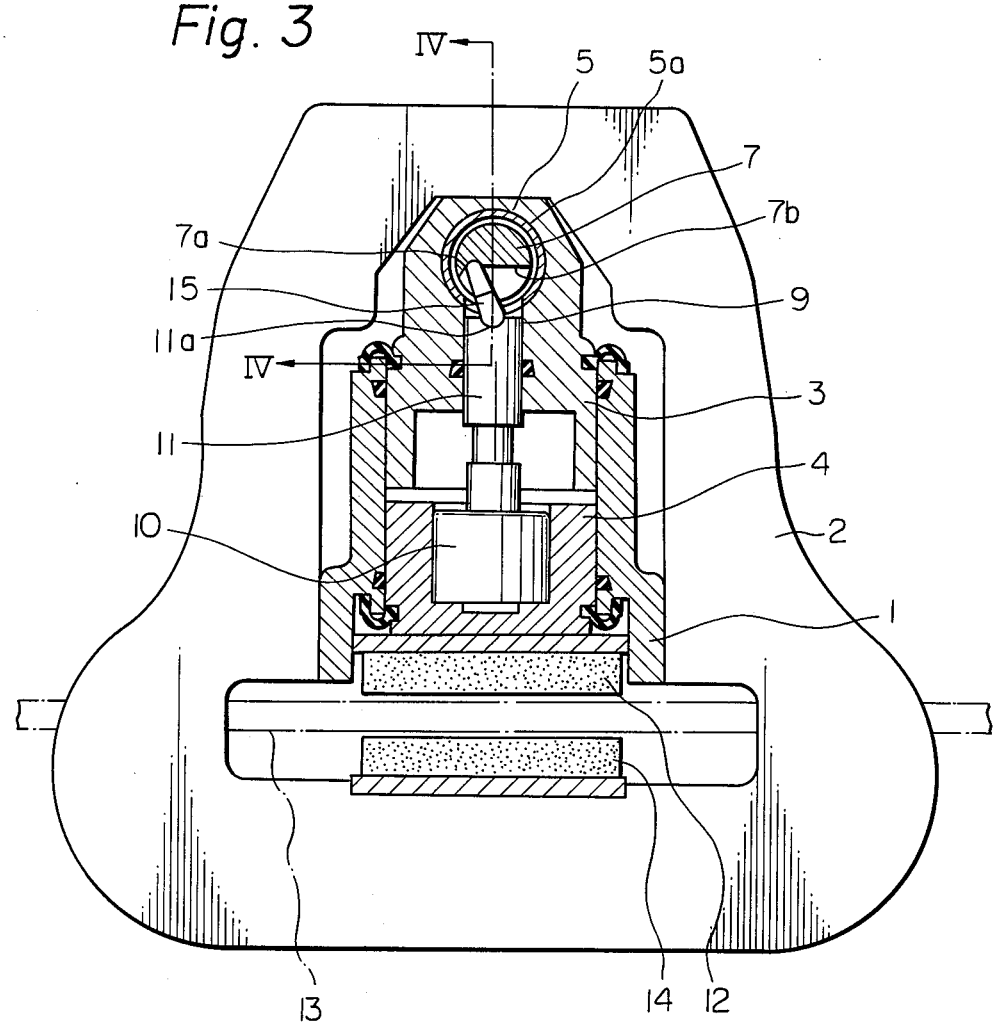
FIG. 3 is a cross-sectional plan view of a disc brake according to the present invention.
Figure 4:
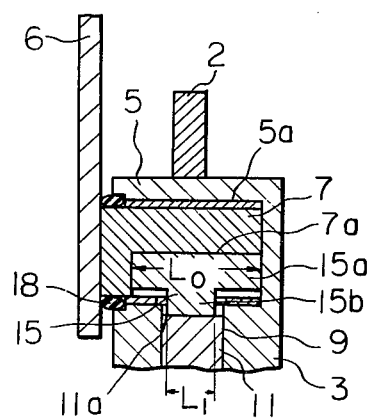
FIG. 4 is a cross-sectional view taken along line IV—IV in FIG. 3.
Figure 5:
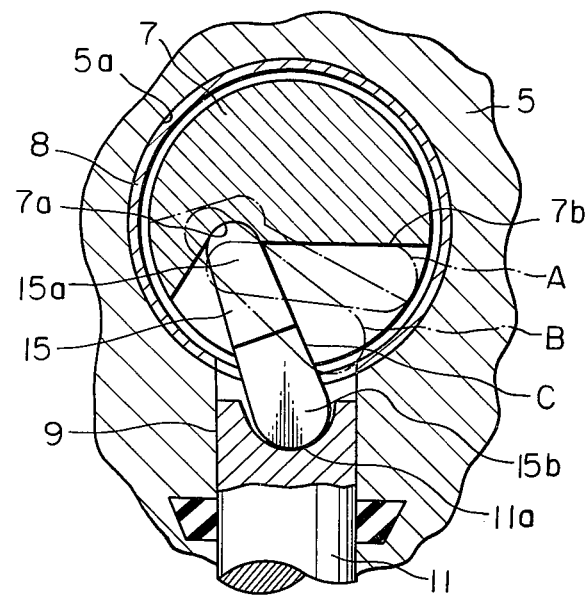
FIG. 5 is an enlarged view of a portion of FIG. 3.

The disc brake shown in FIGS. 3 to 5 inclusive is generally similar to that shown in FIGS. 1 and 2, but is modified according to the present invention. The parts corresponding to FIGS. 1 and 2 are denoted by the same reference numerals with the prime mark omitted.

In FIG. 3, the friction pad actuated by the inner piston 4 is denoted by numeral 12 and the friction pad 14 is applied against the rotatable disc 13 through the yoke 2.

According to the present invention, cam member 7 is modified to provide a groove portion 7b contiguous with the groove portion 7a defining the cam surface. The groove portion 7b cooperates with the groove portion 7a to define a space sufficient to receive the connecting member 15 completely within the outer periphery of the cam member 7 as shown by chain line A in FIG. 5.

The connecting member 15 has a generally T-shaped form as shown in FIG. 4, with the lateral arm portion 15a having a dimension Lo in the direction of the axis of rotation of cam member 7 and engaging with the cam groove 7a, and the vertical leg portion of the T having a dimension L in the same direction is received in the bore 9 and the lower end thereof engages with radial groove 11a formed in the push rod 11.

When the brake lever 6 is actuated to rotate the cam member 7 in the counterclockwise direction in FIG. 3, the movement is transmitted through connecting member 15 to displace the push rod 11 downward in the bore 9. The inner piston 4 is urged in a direction to apply the friction pad 12 against the disc 13, and reaction force acting on the outer piston 3 acts through the yoke 2 to force the friction pad 14 against the disc 13.

In assembling the cam member 7 and the connecting member 15 on the piston 3, the connecting member 15 is first received in the groove 7b as shown by chain line A in FIG. 5, and the connecting member 15 and the cam member 7 are inserted into the mounting hole 5a. By rotating the member 7 by a small amount in the clockwise direction, the connecting member 15 is caused to take the position shown by chain line B with the end portion 15b being received in the bore 9. The portion 15b will then be caused to engage with the groove 11a of the push rod 11 by rotating the cam member 7 in the counterclockwise direction and, the portion 15a of the connecting member 15 will engage with the groove or cam surface 7a as shown in the full line position C in FIG. 5. In practice, the connecting member 15 can easily be located in its position by rotating the cam member suitably.

In the embodiment of FIG. 4, the dimension of the portion 15a engaging in the cam groove 7a is larger than the diameter of the bore 9, so that it is possible to reduce the thickness of the portion 15a or to reduce the radius of curvature at the groove 7a (as viewed in FIGS. 3 and 5) as compared with the thickness of the portion 15b or the radius of curvature of the groove 11a. Further, since the portion 15a will not enter into the bore 9, the assembling operation can be effected reliably. But the connecting member 15 may have other configurations, for example a rectangular shape with the width thereof being smaller than the diameter of the bore 9 as shown in FIG. 7.

As described hereinbefore, the connecting member according to the present invention has a plate-like shape and engages with the cam member 7 and the push rod 11 thereby preventing rotation of the push rod. Therefore a rotation preventing mechanism such as the plate 16' in the prior art devices may be omitted.

Figure 7:
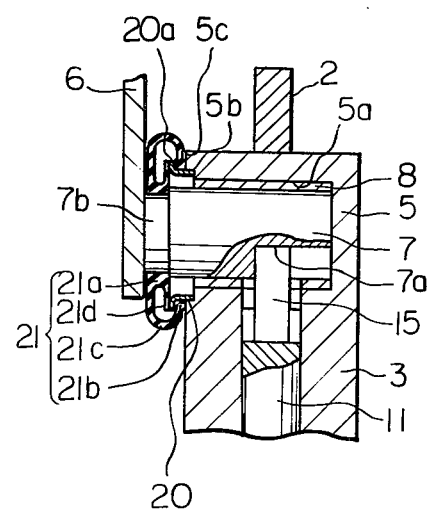
FIG. 7 is a view similar to FIG. 4 but showing a modified form according to the present invention.

FIG. 7 shows another feature of the present invention in which the cam member 7 is sealingly mounted in the mounting hole in a simple and effective manner.

Figure 6:
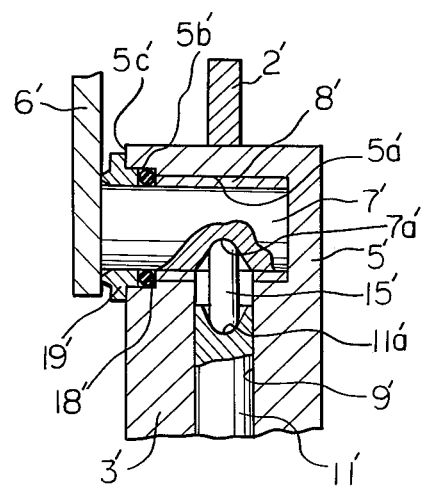
FIG. 6 is a view similar to FIG. 2 but showing a modified form according to the prior art.

Conventionally, the cam member 7' is mounted in the mounting hole 5'a in a friction resistant bushing 8' disposed therein, and a sealing ring such as an O-ring seal 18' prevents ingress of dust or water into the hole 5'a as shown in FIG. 2. Although the construction is simple, the O-ring 18' cannot effectively seal the hole 5'a. Another prior art arrangement shown in FIG. 6 comprises a spacer ring 19' disposed between the brake lever 6' and the O-ring 18' to retain the O-ring 18' in its position. The sealing characteristics of the O-ring 18' are improved, but problems are encountered in that the rotational resistance of the cam member 7' is relatively large.

The construction shown in FIG. 7 can prevent ingress of dust or water into the cam member mounting hole and the rotational resistance of the cam member can be reduced to the minimum.

In FIG. 7, the mounting hole 5a is counterbored at the open end to form an increased diameter portion 5b, and an annular cap member 20 is fitted in the bore portion 5b with outwardly turned flange portion 20a being spaced from the open end surface 5c of the mounting hole 5a. One end 21a of annular dust preventing boot 21 of rubberlike material is fitted on a small diameter portion 7b formed on the outer end portion of the cam member 7 as shown, and the other end portion 21b of the boot 21 is fitted on the cap member 20 and between the flange portion 20a and the surface 5c. The end portions 21a and 21b are connected by thin annular wall 21c. Further, a lip portion 21d extends from the end portion 21a to sealingly contact the annular cap 20 as shown. Thus, the space between the mounting hole 5a and the cam member 7 is sealed doubly by the seal portion 21c and the lip portion 21d, and ingress of dust, water or the like into the space can perfectly be prevented. Moreover the rotational resistance of the cam member can be reduced to a minimum.

As described hereinbefore in detail, the disc brake according to the present invention comprises a connecting member having a plate-like shape for converting rotational movement of a cam member into reciprocating movement of a push rod, so that it is possible to reduce stress or pressure acting between the connecting member and the cam member or the push rod, and to reduce frictional resistance or wear of the connecting member and to assure long and safe service life. By providing the novel dust preventing boot on the cam member, further reliable operation can be attained. The cam member according to the present invention has a connecting member receiving groove for cooperating with the cam surface defining groove to receive the connecting member completely within the periphery of the cam member, so that the assembling operation can be performed easily and reliably.

In the embodiments, the cam member mounting hole is formed in the outer piston of an opposed-piston type disc brake, but the present invention may be applied to disc brakes of any type provided with a mechanical actuator comprising a brake lever, a cylindrical cam member connected to the brake lever and having a cam groove in the outer periphery thereof, and a push rod working in a bore the axis of which is perpendicular to the axis of rotation of the cam member.

What is claimed is:

1. A disc brake comprising a body having a cam member mounting hole and a push rod receiving bore extending transversely thereof and opening into said mounting hole, a brake lever, a cylindrical cam member connected to the brake lever and rotatably disposed in said mounting hole, a push rod reciprocably positioned in said push rod receiving bore, said cam member having a cam groove therein and said push rod having a recess therein, a connecting member having, when viewed in cross-section through the axis of rotation of the cam member, a generally T-shaped configuration with the cross-bar portion of the T-shaped configuration having a dimension larger than the diameter of said push rod receiving bore and being positioned in said cam groove in the cam member and the other end thereof engaging in said recess in the push rod to convert rotational movement of the cam member into linear movement of the push rod, said cam member further having a connecting member receiving groove contiguous to the cam groove in the cam member and having a configuration such that the connecting member can be received wholly within the outer periphery of the cam member, and a dust protecting means disposed between the cam member and the body around the mounting hole, the bottom of said connecting member receiving groove, when viewed in cross-section transverse to the axis of rotation the cam member, being defined by two generally straight lines extending to the circumference of the cam member from said cam groove, said lines being at an obtuse angle with the apex at said cam groove.

* * * * *